(12) United States Patent  (10) Patent No.: US 9,398,015 B2
Hur et al.  (45) Date of Patent: Jul. 19, 2016

(54) METHOD FOR MODIFYING RIGHTS TO SECURITY DOMAIN FOR SMARTCARD, AND SERVER, SMARTCARD, AND TERMINAL FOR SAME

(71) Applicant: KT CORPORATION, Seongnam-si (KR)

(72) Inventors: Guk Hur, Seoul (KR); Jin Hyoung Lee, Seoul (KR); Yeu Min Yoon, Seoul (KR)

(73) Assignee: KT CORPORATION, Seongnam-si (KR)

( * ) Notice: Subject to any disclaimer, the term of this patent is extended or adjusted under 35 U.S.C. 154(b) by 117 days.

(21) Appl. No.: 14/356,032

(22) PCT Filed: Oct. 22, 2012

(86) PCT No.: PCT/KR2012/008683
§ 371 (c)(1),
(2) Date: May 2, 2014

(87) PCT Pub. No.: WO2013/065983
PCT Pub. Date: May 10, 2013

(65) Prior Publication Data
US 2014/0325613 A1  Oct. 30, 2014

(30) Foreign Application Priority Data
Nov. 3, 2011  (KR) .................. 10-2011-0114157

(51) Int. Cl.
*H04L 29/06* (2006.01)
*H04W 12/04* (2009.01)
*H04W 12/06* (2009.01)

(52) U.S. Cl.
CPC ............... *H04L 63/10* (2013.01); *H04W 12/04* (2013.01); *H04W 12/06* (2013.01)

(58) Field of Classification Search
None
See application file for complete search history.

(56) References Cited

U.S. PATENT DOCUMENTS

| 8,196,131 B1* | 6/2012 | von Behren | G06Q 20/367 705/64 |
| 2009/0164322 A1 | 6/2009 | Khan et al. | |
| 2010/0062808 A1* | 3/2010 | Cha | G06Q 20/3229 455/558 |

FOREIGN PATENT DOCUMENTS

| KR | 10-2010-0028922 A | 3/2010 |
| KR | 10-2010-0050115 A | 5/2010 |
| KR | 10-2010-0078612 A | 7/2010 |
| KR | 10-2010-0121038 A | 11/2010 |

OTHER PUBLICATIONS

International Search Report ISA210 in PCT/KR2012/008683 mailed Mar. 28, 2013.
Written Opinion ISA237 in PCT/KR2012/008683 mailed Mar. 28, 2013.

* cited by examiner

*Primary Examiner* — Fatoumata Traore
(74) *Attorney, Agent, or Firm* — Sughrue Mion, PLLC

(57) ABSTRACT

The present invention relates to modifying rights to a security domain for a smartcard, and more specifically, to a server for managing modification of rights to a security domain, a smartcard for modifying the rights to the security domain, a terminal which is loaded with the smartcard, and to a method for modifying the rights.

15 Claims, 7 Drawing Sheets

METHOD FOR MODIFYING RIGHTS TO SECURITY DOMAIN FOR SMARTCARD, AND SERVER, SMARTCARD, AND TERMINAL FOR SAME

TECHNICAL FIELD

The present invention relates to modifying rights to a security domain for a smart card, and more specifically, to a server for managing modification of rights to a security domain, a smart card modifying the rights to the security domain, a terminal which is loaded with the smart card, and to a method for modifying the rights.

BACKGROUND ART

An Universal Integrated Circuit Card (UICC) is a smart card which can be used as a module for authentication of a user as inserted in a terminal. The UICC may store personal information of a user and operator information about a Mobile Network Operation (MNO) which the user subscribes to. For example, the UICC may include an International Mobile Subscriber Identity (IMSI) identifying the user. Also, the UICC may be referred to as a Subscriber Identity Module (SIM) card for Global System for Mobile communications (GSM), or a Universal Subscriber Identity Module (USIM) card for a Wideband Code Division Multiple Access (WCDMA).

When a user inserts a UICC into a terminal of the user, authentication of the user can be automatically performed by using the information stored in the UICC so that the user can conveniently user the terminal. Also, when a user desires to substitute an old terminal with a new terminal, the user can easily substitute the old terminal with the new terminal by inserting a UICC removed from the old terminal into the new terminal.

When terminals which are required to be miniaturized, for example, terminals for Machine-to-Machine (M2M) communications, are manufactured as having a structure for removable UICC, it becomes difficult to miniaturize the terminals. Therefore, an embedded UICC (eUICC), a non-removable UICC has been proposed. Information about a user using the eUICC is stored in the UICC in a form of IMSI.

Since a conventional UICC is implemented as a removable card, a user can open a terminal without a limit to types of terminals or MNOs. However, an IMSI in the eUICC of a terminal can be assigned when the terminal is used only for a specific mobile network operator designated in the manufacturing step of the terminal. Thus, a MNO placing an order for terminals and a manufacturer of the terminals should consider a stock inventory of manufactured terminals, and which becomes a reason of increasing sale prices of terminals. Also, users have inconveniency in changing a mobile network operator to which they subscribe to. Therefore, demanded is a method of opening a terminal by a user without regard to a mobile network operator of his terminal.

The UICC may have a security domain (SD) for a security of an application. Especially, an issuer security domain (ISD), as a card manager, may store a security key of an issuer, and take a charge of authentication for card content management (CCM) of a domain of MNO. However, since the ISD is an entity which can be affected by an MNO, the ISD may be an obstacle when the MNO is changed.

DISCLOSURE

Technical Problem

The present invention provides a method for a terminal including an eUICC to change its mobile network operator, and an apparatus for the same.

Technical Solution

An example embodiment of the present invention provides a smart card comprising a first security domain sharing a key with a management server managing the smart card; a plurality of second security domains sharing a key with a network operator; and a control part controlling whether to activate a state of the second security domain or not according to a state change request signal for the second security domain received through the first security domain.

Other example embodiment of the present invention provides a terminal including a smart card, wherein the smartcard comprising a first security domain sharing a key with a management server managing the smart card; a plurality of second security domains sharing a key with a network operator; and a control part controlling whether to activate a state of the second security domain or not according to a state change request signal for the second security domain received through the first security domain.

Other example embodiment of the present invention provides a server comprising a key storing part storing a key shared with a first security domain of a smart card; an index storing part storing indexes of a plurality of second security domains of the smart card corresponding to a network operator; and a first interface transmitting a state change request signal for the second security domain through the first security domain and receiving an acknowledgement signal for the transmission.

Other example embodiment of the present invention provides a method for changing a security domain right performed in a smart card including a first security domain sharing a key with a management server managing the smart card and a plurality of second security domains sharing a key with a network operator, the method comprising receiving, from the management server, a signal requesting to change a currently active second security domain among the plurality of second security domains into a locked state through the first security domain; changing the currently active second security domain into the locked state; receiving, from the management server, index information of a second security domain to be activated among the plurality of second security domains through the first security domain; and activating the second security domain to be activated.

MODES OF THE INVENTION

Figure 1:
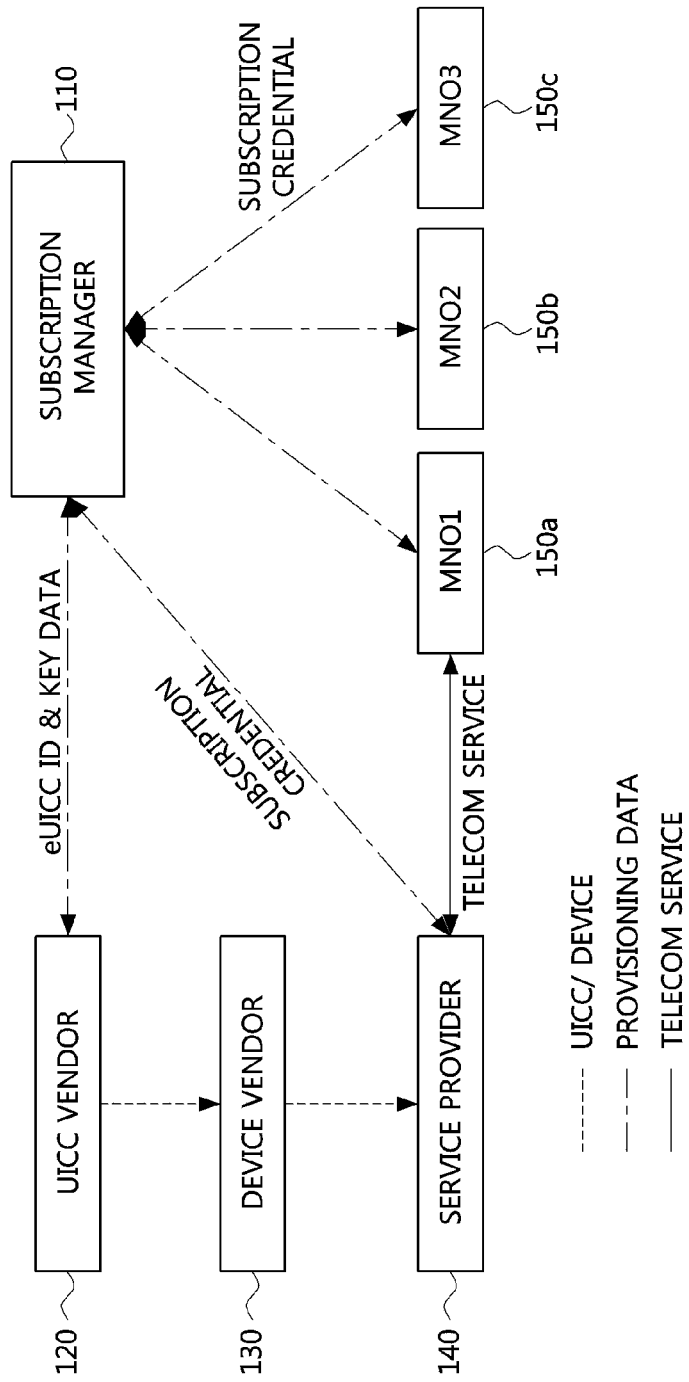
FIG. 1 is a view illustrating a structure of a system to which example embodiments of the present invention can be applied.

Hereinafter, exemplary embodiments of the present invention will be described will be described with reference to the accompanying drawings. In the following description, the same elements will be designated by the same reference numerals although they are shown in different drawings. Furthermore, in the following description of the present embodiment, a detailed description of know functions and configurations incorporated herein will be omitted when it may make the subject matter of the present embodiment unclear.

An Universal Integrated Circuit Card (UICC) is a smart card used for a mobile terminal in communication networks such as Global System for Mobile Communications (GSM), an Universal Mobile Telecommunications System (UMTS), and a Code Division Multiple Access (CDMA) network. In the GSM network, an UICC includes a Subscriber Identity Module (SIM) application. In the UMTS network, an UICC includes an Universal Subscriber Identity Module (USIM) application. Also, in the CDMA network, an UICC includes a CDMA Subscriber Identity Module (CSIM) application. An UICC may be constituted of a CPU, a ROM, a RAM, an EEPROM, and I/O circuits.

A Machine-to-Machine (M2M) terminal which is being discussed currently in a Global Systems for Mobile communications association (GSMA) should have a small size according to its characteristic. However, when a conventional UICC is used for the M2M terminal, a module for installing the UICC in the M2M terminal should be prepared separately. Thus, miniaturization of the M2M terminal becomes difficult if the M2M terminal is manufactured in a form having a structure of a removable UICC.

Therefore, a structure of an embedded UICC (eUICC) which is non-removable is being discussed. In this case, information about a mobile network operator (MNO) using the eUICC should be stored in the eUICC in a form of International Mobile Subscriber Identity (IMSI).

However, an IMSI in the eUICC of a terminal can be assigned when the terminal is used only for a specific mobile network operator designated in the manufacturing step of the terminal. Thus, a MNO placing an order for terminals and a manufacturer of the terminals should consider a stock inventory of manufactured terminals, and which becomes a reason of increasing sale prices of terminals. These problems are being big obstacles to expanding bases of M2M terminals.

As opposed to the conventional removable SIM, an eUICC which is embedded in a terminal may have many problems in an authority of opening, an initiative on value-added services, security of subscriber information, etc. due to its difference of physical structure. Especially, since the UICC is soldered on a circuit board of a terminal, a software-based remote provisioning management is necessary in order to process conventional subscription opening, right assignment, subscription change, etc.

For these, international standardization organizations such as a GSMA and a European Telecommunication Standards Institute (ETSI) are performing standardization on necessary elements including top structures by interworking with related entities such as operators, manufacturers, SIM vendors, etc. A subscription manager (SM) is being focused upon in the standardization organizations as a main issue of the standardization on the eSIM. The SM means an entity or a function/role of performing overall managements on the eSIM such as issuing important profiles (referred to as 'Operator Credentials', 'MNO Credentials', 'Profile', 'eUICC Profile', 'Profile packages', etc.), and processing a procedure of subscription change, etc.

Therefore, a structure of an eUICC and its relationship with a SM may be needed in order to accommodate value-added services of an mobile network operator as they are.

FIG. 1 is a view illustrating a structure of a system to which example embodiments of the present invention can be applied.

Referring to FIG. 1, a system to which the present invention is applied may comprise a Subscription Manager (SM) 110, an UICC vendor 120, a device vendor 130, a service provider 140, and a plurality of mobile network operators MNO1 through MNO3, 150a to 150c.

The SM 110 may act a role of performing overall managements on the eUICC such as issuing operator information such as an operator credential, a MNO credential, a profile, an eUICC profile, profile packages, etc., and processing a procedure of subscription change, etc.

A role of the SM 110 may be divided into a SM-Data Preparation (SM-DP) performing a role of generating operator information and a SM-Secure Routing (SM-SR) performing a role of direct delivery of the operator information. The SM-DP may perform a role of safely generating operator information such as IMSI, K, OPc, value-added service applications, value-added service data, etc. and making a credential package for them. The SM-SR may perform a role of downloading safely the credential package generated by the SM-DP to the eUCC via UICC remote management technologies such as an Over-The-Air (OTA), a GP Secure Communication Protocol (GP SCP), etc.

More specifically, the SM-DP may be responsible for safely preparing a package to be delivered to an eUICC, and interwork with the SM-SR for actual transmission of the package. The core functions of the SM-DP are as follows. In addition to the following functions, additional functions may be added later.

1) Managing functional characteristics and certification level of an eUICC

2) Managing MNO credentials (for example, they include at least one of IMSI, K, value-added service applications, and value-added service data. Also, some of them may be enciphered by a MNO.)

3) Calculating an OTA package for downloading by the SM-SR

The SM-DP may be provided by a specific MNO or a third trusted service manager (hereinafter, referred to as a '3$^{rd}$ TSM'). If the functions of the SM-DP are provided by a third-party organization (3$^{rd}$ TSM), security and trusted relationship may become more important. In addition to a function of a real-time provisioning, the SM-DP may have a function of background processing to a considerable extent. Also, it is predicted that requirements on performance, scalability, and reliability of the SM-DP become more important.

The SM-SR may be responsible for a role of routing and delivering the credential package to a corresponding eUICC safely. The core functions of the SM-SR are as follows.

1) Managing OTA communications with an eUICC through a ciphered virtual private network (VPN)

2) Managing communication with another SM-SR to form an end-to-end path to an eUICC 3) Managing eUICC data used for SM-SR OTA communications provided by an eUICC supplier 4) Protecting communications with an eUICC by filtering only allowed entities (that is, a function of fire wall)

A SM-SR database may be provided by an eUICC vendor 120, a device vendor 130, and MNOs 150a to 150c, and may be used by the MNOs through a SM-SR mesh network.

On the other hand, the GSMA proposed a structure of 'Circle of Trust' which has a concept that an end-to-end trusted relationship between a MNO and an eUCC is established based on overlapped trusted relationship between each similar entities. For example, a MNO may form a trusted relationship with a SM-DP, and the SM-DP may form a trusted relationship with an UICC SM, and the UICC SM may form a trusted relationship with an eUICC. Accordingly, a trusted relationship between the MNO and the eUICC may be formed.

Also, the MNO may form a trusted relationship with the SM-DP, and the SM-DP may form a trusted relationship with a device SM, and the device SM may form a trusted relationship with a terminal. Accordingly, a trusted relationship between the MNO and the terminal may be formed. Hereinafter, a flow between the MNO, the eUICC, and the terminal may be represented similarly to a flow between the SM-DP, the UICC SM, and the device SM.

The UICC vendor 120 is an entity manufacturing an eUICC chip. The eUICC chip manufactured by the UICC vendor 120 is soldered in a terminal by the device vendor 130. The terminal embedding the eUICC may be provided to the service provider 140.

For provisioning, the UICC vendor 120 and the SM 110 may exchange an eUICC identifier and key data for encryption. For subscription, the service provider 140 and the SM 110 may exchange a credential, and the SM 110 and the MNOs 150a to 150c may exchange a credential. When the subscription is completed, the service provider 140 and the MNOs 150a to 150c may maintain telecommunication services.

Figure 2:
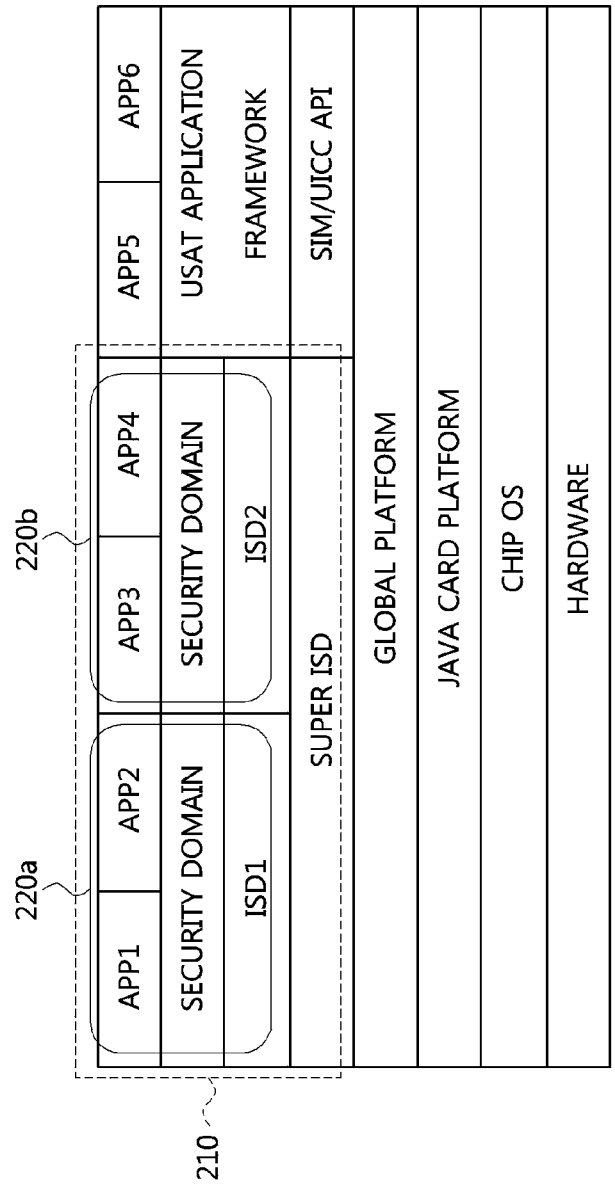
FIG. 2 illustrates a structure of software layers of an eUICC according to an example embodiment of the present invention.

FIG. 2 illustrates a structure of software layers of an eUICC according to an example embodiment of the present invention.

A card architecture according to global platform may comprise a plurality of components providing interfaces independent to hardware and vendors to an application and an off-card management system. Such the components may include at least one application of a card issuer, at least one application for a business partner of the card issuer (that is, an application provider), at least one application to provide other applications with global services (for example, a CSM service), and so on.

All applications may be implemented in a secure runtime environment including hardware-independent application programming interface (API) which supports application mobility. The global platform is not restricted to a specific runtime environment technology, and a card manager is a main card component performing a role of a central manager. A specific key and a security management application which is referred to as a security domain (hereinafter, referred to as 'SD') are generated so that they guarantee complete separation of keys between the card issuer and a plurality of other SD providers.

The SD acts a role of an on-card proxy for an off-card authority. The SD may be generally classified into three types in consideration of three types of the off-card authority recognized by the card.

Firstly, the ISD is a main and essential on-card proxy for a card administrator which usually becomes a card issuer.

Secondly, a supplementary SD acts a role of an additional and selective on-card proxy for a card issuer, an application provider, or their agent.

As a third type, a controlling authority SD, as a special type of a supplementary SD, may act a role of enforcing a security policy applied to all application codes which are loaded onto the card. Also, the controlling authority may use such type of SD as its on-card proxy in order to provide such the function. One or more controlling authority SD may exist.

Generally, three types of SD may be simply referred to as SD. The SD supports security services such as key handling, encryption, decryption, generating electronic signature, and verification for its provider (a card issuer, an application provider, or a controlling authority, etc.). Each SD is configured for a card issuer, an application provider, or a controlling authority when an off-card entity requests to use completely separated keys.

At least one global service application exists in the card, and may provide other applications with a service such as a cardholder verification method (CVM), etc.

The global platform is for operating on a safe multi-application card runtime environment. Such the runtime environment provides hardware-independent API for applications as well as a safe storage and execution environment for applications. Thereby, it may make each application code and data be maintained as separated from other applications. Also, the runtime environment of the card may provide communication services between the card and off-card entities.

The global platform card may also include at least one trusted framework, and such the trusted framework provides inter-application communications between applications. The trusted framework is not an application or a SD, and may exist as an extension or a part of the card runtime environment.

Referring to FIG. 2, a software layer structure of an eUICC may comprise a hardware layer, a chip OS layer on the hardware layer, a Java card platform layer on the chip OS layer, and a global platform (GP) layer on the Java card platform layer.

A SIM/UICC application programming interface (API) layer exists on the GP layer, and a USIM Application Toolkit (USAT) application framework layer exists on the SIM/UICC layer, and an application layer App5 and App6 exists on the USAT application framework layer.

Also, a super issuer security domain (ISD) layer exists on the GP layer, and ISD layers ISD1 and ISD2 each of which is assigned to each MNO exist on the super ISD layer. A security domain layer exists on each of the ISD layers, and an application layer App1 to App4 exists on each of the security domain layer.

The security domain is an application having a special right, supports a security channel protocol operation, and retains encryption keys used for authenticating management function of card contents.

Each security domain, as a special application, may store a security key, provide an encryption service on associated applications, and provide a secure channel protocol.

Each application and each of executable load files may be associated with a security domain, and an application may use an encryption service of an associated security domain.

The security domain is responsible for management of its keys. Thereby, applications and data from various other application providers may exist together in the same card without violating privacy and integrity of each application provider. Also, in an example embodiment of the present invention, the ISD is responsible for management of its keys. Thereby, applications and data from various other MNOs may exist together in the same card without violating privacy and integrity of each MNO.

The keys for all security domains and related encryption operations may provide supports for safe communications during personalizing applications of the application provider, and make safe communications possible during execution time of applications which do not include their safe messaging keys.

Each ISD, as a card manager, may store a secret key of an issuer, and take a charge of authentication for card content management (CCM) in a MNO domain.

The super ISD may select or change a plurality of card managers (that is, ISD), store a secret key of the ISD, manage an index of the ISD, and take a charge of authentication for CCM of a SM-DP domain.

Referring to FIG. 2, the super ISD may be responsible for management of a domain 210, and an ISD1 and an ISD2, which are selected according to each MNO, may be responsible for a domain 220a and 220b respectively.

The information of security domain keys may comprise a key ID, a key version, an encryption algorithm, a length of encryption algorithm, a condition for connection, etc.

For example, according to a GP card standard, a security domain may manage keys as follows.

The key ID and a key version number designate each key in the card uniquely. In other words, the combination of the key ID and the key version number identify a unique key slot in the individual card.

Adding a key is identical to assigning a new key slot to a new key value, a new key ID, or a new key version number.

Substituting a key is related to updating a key slot with a new key value and a related key version number. The key ID is maintained identically. The previous key becomes invalid.

In an example embodiment of the present invention, a super ISD key is a key having a right to access a platform of the eUICC as an access credential for the platform of the eUICC. In the eUICC environment, conventional value-added services of the MNO should be continued. When a provisioning is performed for the first time or a profile is installed during changing MNO, acquisition of right should be possible by using the access credential for the platform of the eUICC. In this case, the super ISD may be used. The GP may provide a function of accommodating the super ISD.

The super ISD may have a structure of key information and key characteristics similar to the structure of key information and key characteristics of the ISD. However, a specific key ID and a specific key version number may be assigned as dedicated for the super ISD. Under the super ISD, at least one card life cycle may exist in at least one ISD domain.

Figure 3:
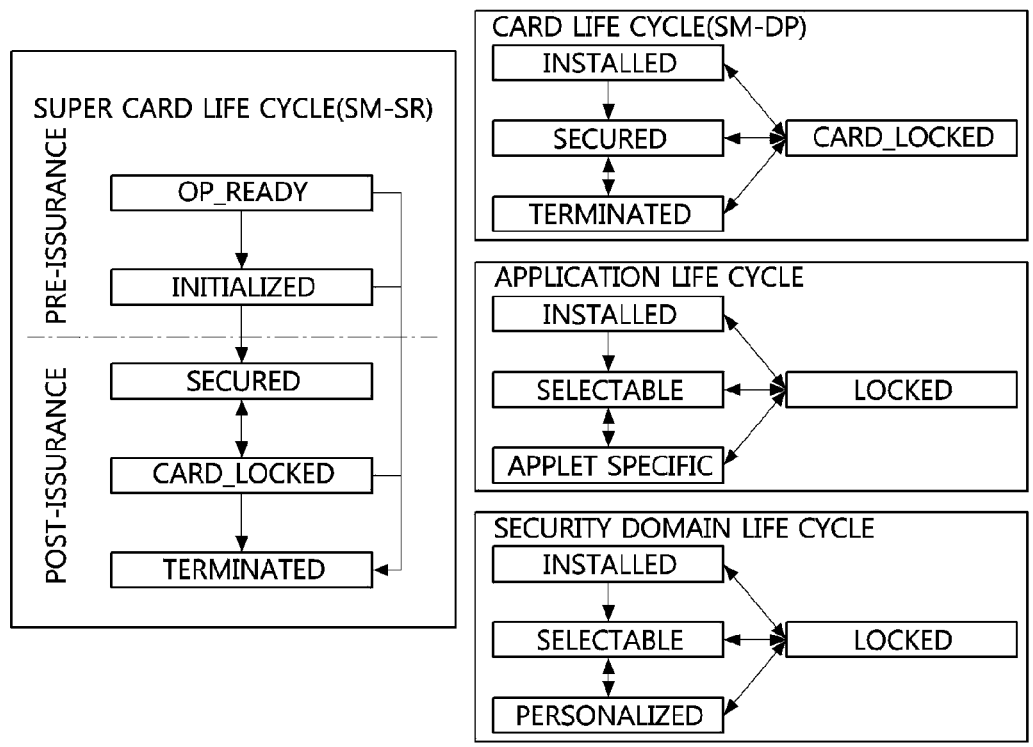
FIG. 3 illustrates a life cycle structure according to an example embodiment of the present invention.

FIG. 3 illustrates a life cycle structure according to an example embodiment of the present invention.

Referring to FIG. 3, a super card life cycle of the eUICC, which is managed by the SM-SR in connection with the super ISD, may have an OP_READY state, an INITIALIZED state, a SECURED state, a CARD_LOCKED state, and a TERMINATED state. The OP_READY state is a state in which an execution environment is prepared to be used and the super ISD is prepared to receive, execute, and respond Application Protocol Data Unit (APDU) instructions. The INITIALIZED state is a state in which the card is generated. The card in the INITIALIZED state cannot be returned to the OP_READY state. The SECURED state is a state in which an issuance of the card is completed and a security of the card is stabilized. The card in the SECURED state cannot be returned to the INITIALIZED state. The CARD_LOCKED state is a state in which the card is locked temporarily. Contents in the card cannot be modified. The card in the CARD_LOCKED state cannot be returned to the SECURED state. The TERMINATED state is a state in which the card is discarded. Contents in the card cannot be modified. The card in the TERMINATED state cannot be returned to any other state.

A card life cycle of the eUICC, which is managed by the SM-DP in connection with the ISD, may have an INSTALLED state, a SECURED state, a TERMINATED state, and a CARD_LOCKED state. The INSTALLED state is a state in which the ISD becomes an entity of a GP registry and the entity can be accessed by authorized external entities. The SECURED state is a state in which a security of the card is stabilized. The TERMINATED state is a state in which an ISD related to a specific MNO is deleted or deactivated. The CARD_LOCKED state is a state in which the card is locked temporarily.

At least one card life cycle, which is described above, may exist in a single super card life cycle. That is, when a MNO related to a terminal equipped with the eUICC is changed, a card life cycle related to a previous MNO is terminated. However, a card life cycle related to a new MNO may be started newly, and all the card life cycles may exist in the super card life cycle.

A life cycle of an application may have an INSTALLED state, a SELECTABLE state, an applet specific state, and a LOCKED state. The INSTALLED state is a state in which execution codes of the application are properly linked and necessary memories are allocated to the application. The SELECTABLE state is a state in which the application can receive instructions from external entities. The applet specific state is a state in which the application determines its operation by itself. The LOCKED state is a state in which the application is temporarily locked.

A life cycle of a security domain may have an INSTALLED state, a SELECTABLE state, a PERSONALIZED, and a LOCKED state. The INSTALLED state is a state in which the security domain becomes an entity of a GP registry and the entity can be accessed by authorized external entities. The SELECTABLE state is a state in which the security domain can receive instructions from external entities. The PERSONALIZED state is a state in which the security domain has all personalization data and keys for execution. The LOCKED state is a state in which the security domain is temporarily locked.

Figure 4:
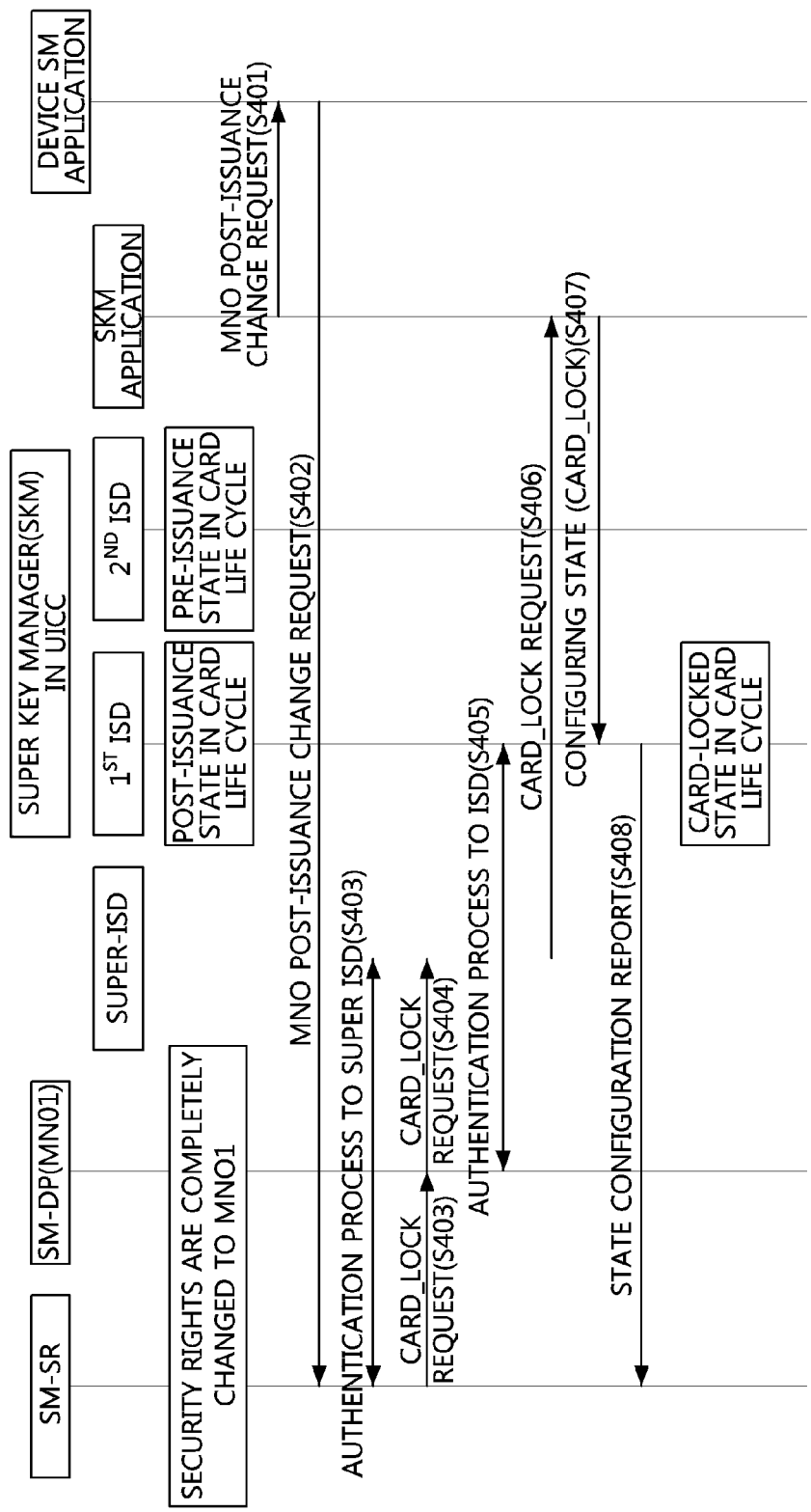
FIG. 4 and FIG. 5 are flow charts of a method for changing MNO according to an example embodiment of the present invention.
Figure 5:
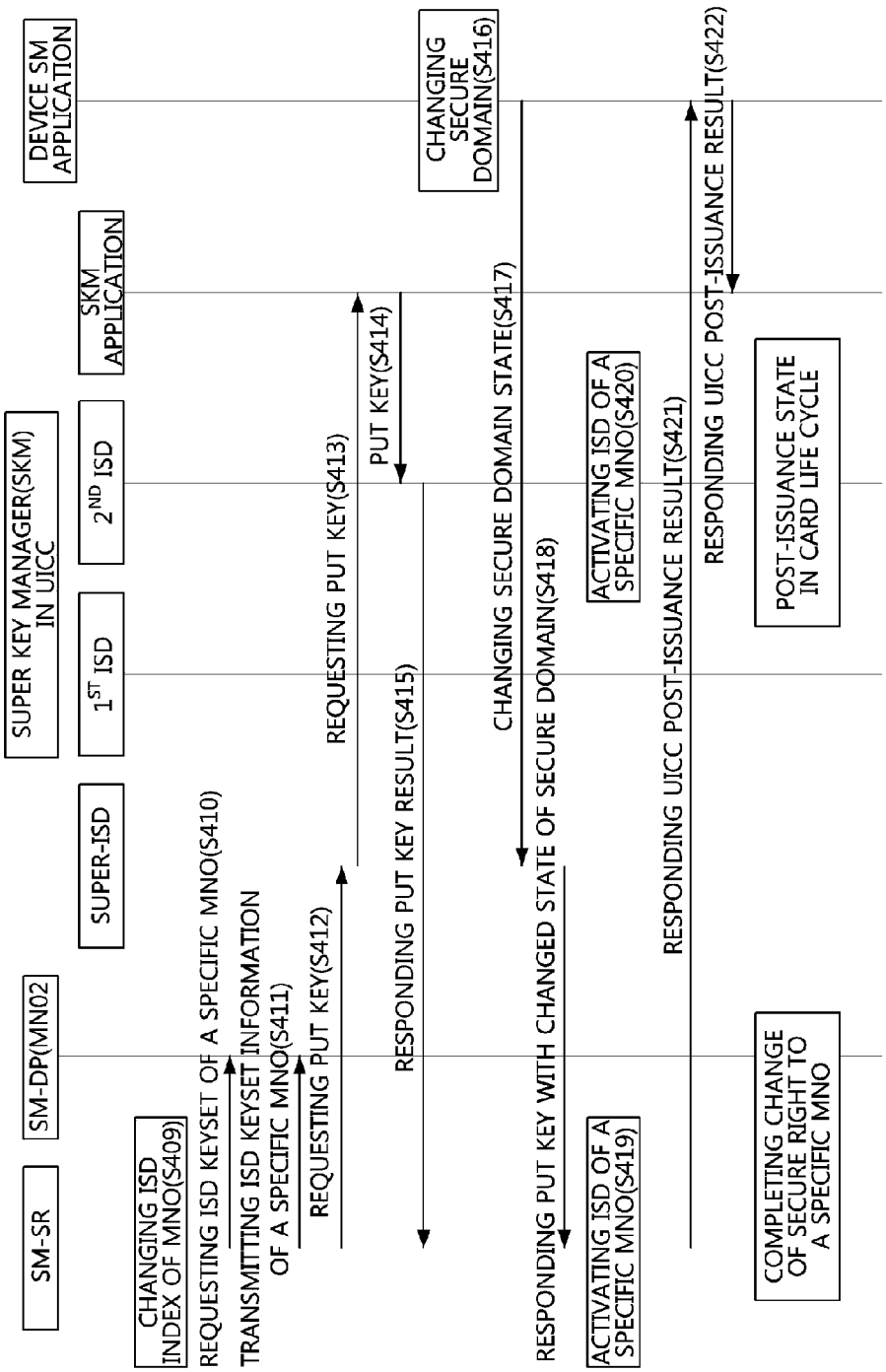

FIG. 4 and FIG. 5 are flow charts of a method for changing MNO according to an example embodiment of the present invention. However, a method illustrated in FIG. 4 and FIG. 5 is not only applied to changing MNO. A method illustrated in FIG. 4 may also be applied to a procedure of closing or temporary stopping for a specific MNO, and a method illustrated in FIG. 5 may also be applied to a procedure of subscribing or re-subscribing to a specific MNO.

The UICC includes a super key manager (SKM) entity for managing a super key. The SKM may have a super ISD domain, a plurality of ISD domains such as a $1^{st}$ ISD domain, a $2^{nd}$ ISD domain, etc.), and a SKM application domain. The plurality of ISD domains such as the $1^{st}$ ISD domain, the $2^{nd}$ ISD domain, etc. correspond to a plurality of MNOs. The SM-DP illustrated in FIG. 4 is an entity including information about at least $1^{st}$ ISD, and the SM-DP illustrated in FIG. 5 is an entity including information about at least $2^{nd}$ ISD. They may be configured as a single entity or different entities.

The terminal equipped with the UICC may have a device SM application.

In an initial state, the SM-SR and the SM-DP are in a state in which a change of security right to a specific MNO (MNO1) has been completed.

In the SKM of the UICC, the $1^{st}$ ISD is in a post-issuance state of card life cycle, and the $2^{nd}$ ISD is in a pre-issuance state of card life cycle. That is, the $1^{st}$ ISD is in active state and the $2^{nd}$ ISD is in inactive state. Such the situation may occur when the terminal changes its MNO from a MNO1 corresponding to the $1^{st}$ ISD to a MNO2 which is not subscribed yet.

Or, the $2^{nd}$ ISD may be in CARD-LOCKED state of card life cycle, that is, in inactive state. Such the situation may occur when the terminal changes its MNO again from the MNO1 to MNO2 after the terminal changed its MNO from the MNO2 corresponding to the $2^{nd}$ ISD to the MNO1 corresponding to the currently activated $1^{st}$ ISD.

On the other hand, in an initial state, the SM-SR and the SM-DP are in a state in which the change of security right to a specific MNO (MNO1) has been completed.

Referring to FIG. 4, when a MNO is changed, a SKM application in the UICC requests a device to change a MNO post-issuance into another MNO (S401). The device requests the SM-SR to change the MNO post-issuance into another MNO (S402).

The SM-SR performs an authentication procedure by using the super ISD in the UICC (S403). The authentication procedure may be performed by using a key shared by the SM-SR and the super ISD.

After the authentication procedure is completed, the SM-SR requests the SM-DP to change a card lift cycle of the $1^{st}$ ISD into a CARD_LOCKED state (S403). The request for CARD_LOCKED from the SM-SR to the SM-DP may include index information of the corresponding ISD ($1^{st}$ ISD). The SM-DP requests CARD_LOCKED of the $1^{st}$ ISD to the super ISD (S404). The request for CARD_LOCKED from the SM-DP to the super ISD may include index information of the corresponding ISD ($1^{st}$ ISD). In addition, the SM-SR performs an authentication procedure with the $1^{st}$ ISD (S405).

The super ISD which received the request of CARD-LOCKED for the $1^{st}$ ISD from the SM-DP requests a CARD_LOCKED of the $1^{st}$ ISD to a SKM application (S406). Only the super ISD has a right to request the SKM application to change a life cycle of ISD ($1^{st}$ ISD, $2^{nd}$ ISD, etc.). The SKM application which received the request of CARD_LOCKED from the super ISD configures state of the $1^{st}$ ISD as CARD_LOCKED (S407). Then, the $1^{st}$ ISD reports, to the SM-SR, configuration information including information about an index of the ISD and the state of CARD_LOCKED (S408).

When the step S408 is completed, the $1^{st}$ ISD is in the CARD_LOCKED state of card life cycle.

Meanwhile, the above-described steps S401 to S408 may also be performed when a close procedure or a temporary stop procedure for the MNO1. In these cases, the messages transmitted in the steps S401 and S402 may be a close request message or a temporary stop request message instead of the MNO change request message. Then, the step S408 may complete all procedures.

FIG. 5 illustrates steps after the step S408 in a method for changing MNO.

Referring to FIG. 5, the SM-SR which received configuration state information from the $1^{st}$ ISD changes an ISD index of MNO from an index of the $1^{st}$ ISD corresponding to MNO1 to an index of the $2^{nd}$ ISD corresponding to MNO2 (S409).

The SM-SR requests ISD key information (keyset) of MNO2 to the SM-DP (S410). The ISD index of MNO2 changed in the step S409 may be used for the request of ISD key information. The SM-DP transmits the ISD key information of MNO2 to the SM-SR (S411).

The SM-SR requests 'Put key' by delivering the ISD index and the ISD key information to the super ISD (S412). The ISD index and/or the ISD key information may be encrypted by using a key shared by the SM-SR and the super ISD. The super ISD requests the SKM application to provide the ISD index and the ISD key information (S413). In case that the ISD index and/or the ISD key information are encrypted by the SM-SR, the super ISD can decrypt the encrypted information. The SKM application inputs a key of the $2^{nd}$ ISD corresponding to a specific MNO (MNO2) by using ISD key information of the specific MNO (MNO2) based on the ISD index (S414). The $2^{nd}$ ID may transmit a 'Put key' result by notifying the generated result to the SM-SR (S415). The response message may include the ISD index.

Meanwhile, a case in which the $2^{nd}$ ISD stores key information or a key in advance may exist. For example, if the $2^{nd}$ ISD was activated and then the activated security domain has been changed from the $2^{nd}$ ISD to the $1^{st}$ ISD, the $2^{nd}$ ISD may be currently in CARD_LOCKED state. In this case, the steps S410 and S412 for the SM-SR to obtain key information from the SM-DP may be omitted. Also, the steps S412 to S414 may include an ISD index not ISD key information.

The SKM application changes the security domain from the $1^{st}$ ISD corresponding to the MNO1 to the $2^{nd}$ ISD corresponding to the MNO2 (S416). The SKM application instructs the super ISD to change a state of a security domain to the $2^{nd}$ ISD (S417). The super ISD responds a result of 'Put key' together with the changed security domain state (S418). The response message may include an ISD of MNO.

After such the procedure is completed, the ISD of MNO2 is activated (S419, S420). Therefore, the MNO2 (or, the SM-DP) may become able to access the UICC (or, the $2^{nd}$ ISD) by using a key shared by itself and the UICC (or, the $2^{nd}$ ISD).

Finally, the SM-SR responds to the device with a result of the post-issuance (S421), and the device responds to the SKM application with it (S422).

After completion, the SM-SR and the SM-DP are in states that they have changed security rights to the MNO2, and the MNO2 may become able to access the UICC. The $2^{nd}$ ISD is in a post-issuance state of card life cycle, that is, a SECURED state.

Meanwhile, when a close procedure or a temporary stop procedure is performed for a specific MNO, the steps S401 to S408 of FIG. 4 and the steps S421 and S422 of FIG. 5 may be performed. Before the procedures are performed, a card life cycle of a MNO may be a post-issuance state, and a card life cycle for other MNO may be a pre-issuance state or a CARD-LOCKED state. Also, after the procedures are completed, card life cycles for all MNO are pre-issuance states or CARD-LOCKED states.

Or, when an opening procedure or re-opening procedure is performed for a closed or temporally stopped terminal, the steps S401 and S402 of FIG. 4 and the steps S409 to S422 of FIG. 5 may be performed. Before the procedures are performed, card life cycles for all MNO may be pre-issuance states or CARD-LOCKED states. Also, after the procedures are performed, a card life cycle of a MNO may be a post-issuance state, and a card life cycle for other MNO may be a pre-issuance state or a CARD-LOCKED state.

Figure 6:
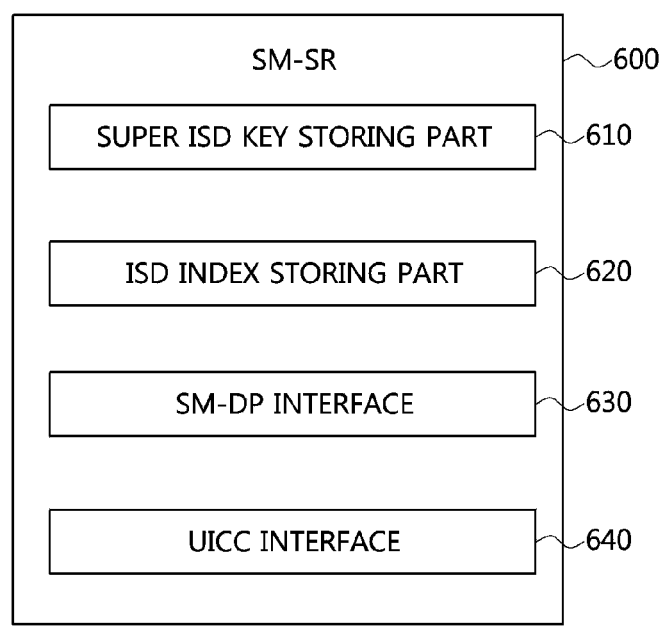
FIG. 6 is a block diagram illustrating a configuration of a SM-SR according to an example embodiment of the present invention.

FIG. 6 is a block diagram illustrating a configuration of a SM-SR according to an example embodiment of the present invention.

Referring to FIG. 6, a SM-SR 600 may comprise a super ISD key storing part 610, an ISD index storing part 620, a SM-DP interface 630, and an UICC interface 640.

The super ISD key storing part 610 may store a key shared with a super ISD of the UICC. The key shared with the super ISD may be obtained from an UICC vendor which manufactured the UICC.

The ISD index storing part 620 may store an index of ISD corresponding to each MNO.

The SM-DP interface 630 is an interface to be used for communicating with a SM-DP. The SM-DP interface 630 may request key information of ISD corresponding to a MNO to the SM-DP, and receive the key information from the SM-DP.

The UICC interface 640 is an interface to be used for communicating with an UICC. The UICC interface 640 may perform an authentication procedure with the super ISD of the UICC. The UICC interface 640 may transmit a request signal to change a life cycle state of an ISD corresponding to each MNO via the super ISD of the UICC. For example, the UICC interface 640 may transmit, to the super ISD, a request signal to change a life cycle state of each ISD from a pre-issuance state to a post-issuance state, or from the post-issuance state to a CARD-LOCKED state, or from the CARD-LOCKED state to the post-issuance state. When a current MNO is changed from MNO1 to MNO2, the UICC interface 640 may transmit a request to change a life cycle state of an $1^{st}$ ISD corresponding to MNO1 from a post-issuance state to a CARD-LOCKED state, and a request to change a life cycle state of an $2^{nd}$ ISD corresponding to MNO2 from a pre-issuance state or a CARD-LOCKED state to a post-issuance state.

Figure 7:
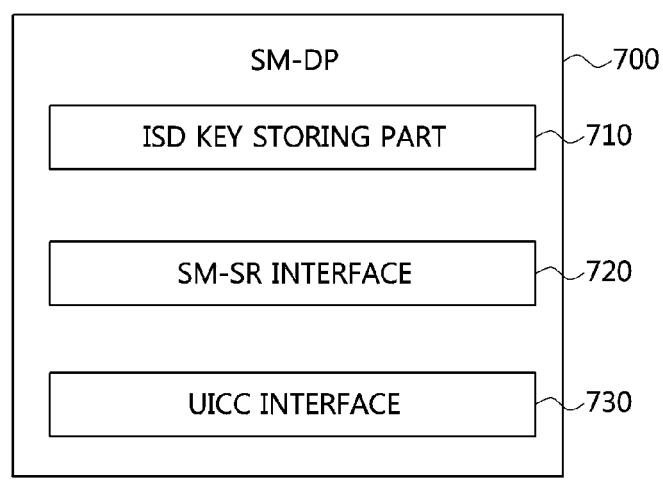
FIG. 7 is a block diagram illustrating a configuration of a SM-DP according to an example embodiment of the present invention.

FIG. 7 is a block diagram illustrating a configuration of a SM-DP according to an example embodiment of the present invention.

Referring to FIG. 7, a SM-DP 700 may comprise a ISD key storing part 710, a SM-SR interface 720, and an UICC interface 730.

The ISD key storing part 710 may store a key shared with an ISD of eUCC embedded in a terminal which is opened to a MNO. Thereby, the MNO may provide services through the eUICC.

The SM-SR interface 720 may receive a key information request signal from the SM-SR, and transmit key information to the SM-SR.

The UICC interface 730 may provide a corresponding ISD in the eUICC with services by using the key shared with the ISD of the eUICC. As an example, the UICC interface 730 may perform an authentication procedure with the corresponding ISD in the eUICC.

Figure 8:
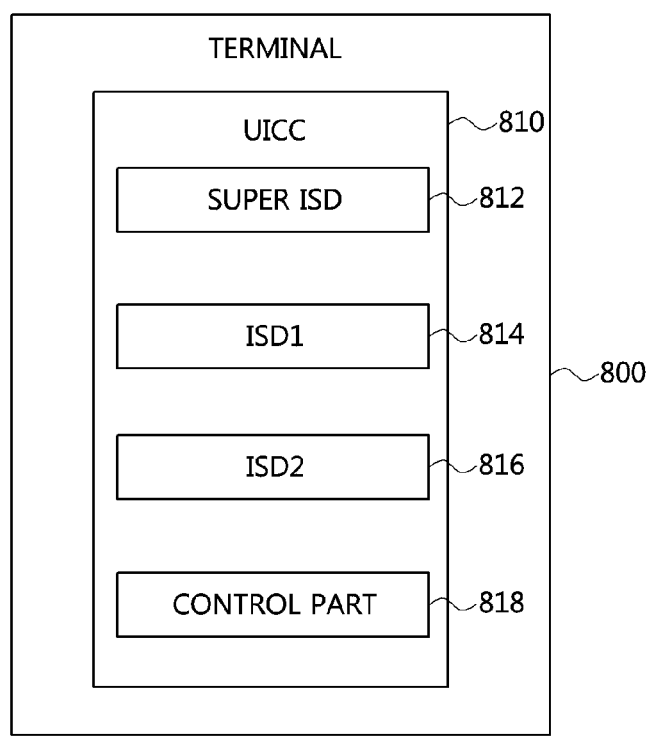
FIG. 8 is a block diagram illustrating a configuration of a terminal according to an example embodiment of the present invention.

FIG. 8 is a block diagram illustrating a configuration of a terminal according to an example embodiment of the present invention.

Referring to FIG. 8, a terminal 800 may include an eUICC 810.

The eUICC 810 may comprise a super ISD 812, at least one ISD such as an ISD1 814 and an ISD2 816, and a controlling part 818.

The super ISD 812 may share a key with a SM-SR. Thereby, the super ISD 812 may perform an authentication procedure with the SM-SR.

Also, the super ISD 812 may receive a life cycle state change request signal for each of ISDs 814 and 816 from the SM-SR. For example, the super ISD 812 may receive, from the SM-SR, a signal requesting to change a life cycle state of each of the ISDs 814 and 816 from a pre-issuance state to a post-issuance state, or from the post-issuance state to a CARD-LOCKED state, or from the CARD-LOCKED state to a post-issuance state. That is, the super ISD 812 may receive, from the SM-SR, a signal requesting to change a state of each of the ISDs 814 and 816 from inactivated state to activated state or from activated state to inactivated state. Thereby, at the time of changing MNO, it may receive a signal to change an activated security domain.

Also, the super ISD 812 may receive, from the SM-SR, index and key information of an ISD to be activated correspondingly to a specific MNO.

The ISD 814 and 816 may be activated correspondingly to a specific MNO. The activated ISD 814 and 816 may receive services from the specific MNO by using a key of the ISD. Also, the ISD 814 and 816 may perform an authentication procedure with the SM-DP.

The controlling part 818 may change a life cycle state of each of the ISDs 814 and 816 based on a life cycle state change request signal for the ISD received through the super ISD 812. For example, the controlling part 818 may change a life cycle state of each of the ISDs 814 and 816 from a pre-issuance state to a post-issuance state, or from the post-issuance state to a CARD-LOCKED state, or from the CARD-LOCKED state to a post-issuance state. That is, the controlling part 818 may change a state of each of the ISDs 814 and 816 from inactivated state to activated state or from activated state to inactivated state. Thereby, at the time of changing MNO, the controlling part 818 may change an activated security domain.

Also, the controlling part 818 may input 'key information' to the ISD 814 or 816 corresponding to the specific MNO by using index and key information of the ISD received through the super ISD 812.

Through the above-described method, an eUICC may change a subscribed MNO in a software manner.

Although the above-described example embodiments were explained as an examples of an eUICC included in a M2M terminal, the present invention is not restricted to the specific example, and may be applied to other IC cards. Also, the present invention may be applied to various IC cards such as a standard Plug-In SIM (2FF), a Mini-SIM (3FF), a SMD SIM (4FF), etc. Of course, there is a further advantage in being used in a M2M domain for which USIM is basically used in an embedded form.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A smart card comprising:
    a first security domain configured to share a first key with a management server configured to manage the smart card;
    a plurality of second security domains configured to share a second key with a network operator configured to manage a network to which the smart card is connected; and
    a control part configured to control whether to activate a state of a given second security domain among the second security domains according to a state change request signal for the given second security domain received through the first security domain, wherein the state change request signal includes a first request signal to change an active second security domain among the second security domains into an inactive state and a second request signal to change an inactive second security domain among the second security domains into an active state, and wherein, in response to the state change request signal indicating that the given second security domain is activated, the activated second security domain shares the second key with the network operator.

2. The smart card of claim 1, wherein the first security domain is configured to request the management server to perform an authentication procedure.

3. The smart card of claim 1, wherein the second security domain is configured to request the network operator to perform an authentication procedure.

4. The smart card of claim 1, wherein the second security domain is an Issuer Security Domain (ISD).

5. A terminal including a smart card, wherein the smartcard comprises:
   a first security domain configured to share a key with a management server, which is configured to manage the smart card;
   a plurality of second security domains configured to share a key with a network operator configured to manage a network to which the terminal is connected; and
   a control part configured to control whether to activate a state of a given second security domain among the second security domains according to a state change request signal for the given second security domain received through the first security domain,
   wherein the state change request signal includes a first request signal to change an active second security domain among the second security domains into an inactive state and a second request signal to change an inactive second security domain among the second security domains into an active state, and
   wherein, in response to the state change request signal indicating that the given second security domain is activated, the activated second security domain shares the second key with the network operator.

6. The terminal of claim 5, wherein the first security domain is configured to request the management server to perform an authentication procedure.

7. The terminal of claim 5, wherein the second security domain is configured to request the network operator to perform an authentication procedure.

8. The terminal of claim 5, wherein the control part is configured to receive an index identifying the given second security domain and key information of the given second security domain through the first security domain, and input the key information to the given second security domain.

9. The terminal of claim 5, wherein the second security domain is an Issuer Security Domain (ISD).

10. A server comprising:
    a key storage configured to store a key to be shared with a first security domain of a smart card;
    an index storage configured to store indexes identifying a plurality of second security domains of the smart card, the second security domains corresponding to a network operator configured to manage a network to which the server is connected; and
    a first interface processor configured to transmit a state change request signal for a given second security domain among the second security domains through the first security domain and to receive an acknowledgement signal in response to the transmitted state change request signal,
    wherein the state change request signal includes a first request signal to change an active second security domain among the second security domains into an inactive state and a second request signal to change an inactive second security domain among the second security domains into an active state, and
    wherein, in response to the state change request signal indicating that the given second security domain is activated, the activated second security domain shares another key with the network operator.

11. The server of claim 10, wherein the first interface processor is configured to transmit the first request signal to change an active second security domain into an inactive state, and transmit the second request signal to change another inactive second security domain into an active state.

12. The server of claim 10, wherein the second security domain is an Issuer Security Domain (ISD).

13. A method for changing a security domain right configured to be performed by a smart card including a first security domain configured to share a key with a management server configured to manage the smart card and a plurality of second security domains configured to share a key with a network operator configured to manage a network to which the smart card is connected, the method comprising:
    receiving, from the management server, a signal requesting to change a currently active second security domain among the plurality of second security domains into a locked state through the first security domain;
    changing the currently active second security domain into the locked state;
    receiving, from the management server, index information identifying a second security domain to be activated among the plurality of second security domains through the first security domain;
    activating the second security domain based on the index information; and
    sharing, by the second security domain activated based on the index information, another key with the network operator.

14. The method of claim 13, further comprising performing, by the management server, an authentication procedure through the first security domain.

15. The method of claim 13, wherein the network operator is configured to provide a service to the currently activated second security domain, and wherein the method further comprises performing, by the network operator, an authentication procedure through the currently activated second security domain.

* * * * *